(12) United States Patent
Heinisch et al.

(10) Patent No.: US 12,510,122 B2
(45) Date of Patent: Dec. 30, 2025

(54) COMPENSATING COUPLING

(71) Applicant: Schaeffler Technologies AG & Co. KG, Herzogenaurach (DE)

(72) Inventors: Andreas Heinisch, Sailershausen (DE); Patrick Weissenberger, Kürnach (DE); Matthias Wetterich, Rottershausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 434 days.

(21) Appl. No.: 17/927,411

(22) PCT Filed: Feb. 11, 2021

(86) PCT No.: PCT/DE2021/100134
§ 371 (c)(1),
(2) Date: Nov. 23, 2022

(87) PCT Pub. No.: WO2021/239171
PCT Pub. Date: Dec. 2, 2021

(65) Prior Publication Data
US 2023/0193959 A1 Jun. 22, 2023

(30) Foreign Application Priority Data
May 26, 2020 (DE) .................... 102020114017.7

(51) Int. Cl.
*F16D 3/10* (2006.01)
*F16D 9/08* (2006.01)
(Continued)

(52) U.S. Cl.
CPC ............... *F16D 3/10* (2013.01); *F16D 9/08* (2013.01); *F16C 3/026* (2013.01); *F16D 3/185* (2013.01); *F16D 3/34* (2013.01)

(58) Field of Classification Search
CPC ... F16D 3/10; F16D 9/08; F16D 3/185; F16D 3/34; F16C 3/026
(Continued)

(56) References Cited

U.S. PATENT DOCUMENTS 2,708,888 A * 5/1955 Varney ................. A63H 19/18
464/115
2,734,359 A 2/1956 Mullheim et al.
(Continued)

FOREIGN PATENT DOCUMENTS

| CN | 101387564 | 3/2009 |
| CN | 103443461 | 12/2013 |

(Continued)

*Primary Examiner* — Greg Binda
(74) *Attorney, Agent, or Firm* — Volpe Koenig

(57) ABSTRACT

A compensating coupling comprises two outer coupling parts, namely an input-side coupling part and an output-side coupling part, both of which are to be connected to rotatable elements, more particularly shafts, and a center coupling part, which can be moved to a limited extent relative to the outer coupling parts. The center coupling part is composed of: a tube piece in the form of a damping element; and two tube end pieces, which are fastened to the tube piece and which are each designed to be fitted onto one of the outer coupling parts in a centered manner by ball head centering.

5 Claims, 2 Drawing Sheets

(51) Int. Cl.
*F16C 3/02* (2006.01)
*F16D 3/18* (2006.01)
*F16D 3/34* (2006.01)

(58) Field of Classification Search
USPC .......................... 464/32, 119, 151, 153, 156
See application file for complete search history.

(56) References Cited

U.S. PATENT DOCUMENTS

| | | | | |
|---|---|---|---|---|
| 3,521,462 | A * | 7/1970 | Heidrich | F16D 3/185 464/160 |
| 3,613,396 | A * | 10/1971 | Drevard | F16D 3/202 464/115 |
| 4,068,499 | A * | 1/1978 | Sharp | F16D 3/2055 464/115 |
| 4,692,127 | A * | 9/1987 | Wagner | F16D 3/207 464/119 |
| 4,892,433 | A * | 1/1990 | Schreiber | F16D 3/2237 464/181 |
| 6,524,191 | B1 * | 2/2003 | Tennies | F16D 3/185 464/154 |
| 6,719,638 | B2 * | 4/2004 | Wethered | A63D 15/12 |
| 7,963,853 | B2 * | 6/2011 | Brace | F16C 3/026 464/181 |
| 8,926,590 | B2 * | 1/2015 | Petroff | A61B 5/0084 464/32 |
| 11,125,277 | B2 * | 9/2021 | Cheng | F16D 3/2245 |
| 2006/0276246 | A1 | 12/2006 | Needes et al. | |

FOREIGN PATENT DOCUMENTS

| | | |
|---|---|---|
| CN | 204402380 | 6/2015 |
| CN | 105465209 | 4/2016 |
| CN | 107776653 | 3/2018 |
| CN | 210128024 | 3/2020 |
| DE | 1284704 | 12/1968 |
| DE | 1286830 | 1/1969 |
| DE | 3706135 | 9/1988 |
| DE | 102006011978 | 9/2007 |
| DE | 102006043897 | 3/2008 |
| DE | 102009050153 | 4/2011 |
| DE | 102011118989 | 5/2013 |
| DE | 102017010096 | 4/2019 |
| EP | 1288515 | 3/2003 |
| EP | 3001062 | 3/2016 |
| JP | H04194417 | 7/1992 |
| WO | 2005057038 | 6/2005 |
| WO | 2012122972 | 9/2012 |

* cited by examiner

COMPENSATING COUPLING

CROSS-REFERENCE TO RELATED APPLICATIONS

This application is the U.S. National Phase of PCT Appln. No. PCT/DE2021/100134, filed Feb. 11, 2021, which claims the benefit of German Patent Appln. No. 10 2020 114 017.7, filed May 26, 2020, the entire disclosures of which are incorporated by reference herein.

TECHNICAL FIELD

The disclosure relates to a compensating coupling provided for compensating for a radial offset between two rotatable elements, in particular shafts.

BACKGROUND

Such a shaft coupling constructed as a compensating coupling is known, for example, from DE 10 2006 043 897 A1. The known shaft coupling is provided for coupling a encoder shaft to an electric motor. A torque transmission element is designed and arranged between the motor shaft of the electric motor and the encoder shaft in such a way that radial and axial offsets as well as angular offsets of the motor shaft and encoder shaft can be compensated for.

A further compensating coupling of this type is disclosed in DE 1 286 830 A. In this document, a torque transmission element connected between two shafts, an input shaft and an output shaft, is referred to as a floating element. The floating element has two mutually perpendicularly aligned guide grooves which face the two shafts.

DE 10 2017 010 096 A1 describes a tool holder with an elastic compensating coupling. Here, an elastic link interacts with an outer coupling part and an inner coupling part of the compensating coupling.

DE 37 06 135 A1 discloses a torsionally rigid compensating coupling with an axial damper, which is designed in particular for an injection pump drive. The compensating coupling comprises two coupling halves and a hollow shaft arranged between them, which is connected to one of the coupling halves on both sides via membrane lamellae.

DE 1 284 704 A discloses a compensating coupling which is also intended to be usable as a slipping coupling. The compensating coupling is intended for connecting two shaft ends, wherein one shaft end is connected to a sleeve and the other shaft end is connected to internal parts of the coupling which are held in the sleeve.

A cardan shaft coupling is known from EP 1 288 515 B1, which comprises a telescopic shaft arrangement. Components of the telescopic shaft arrangement are two shafts which can be displaced axially in relation to one another along a longitudinal axis.

In principle, metal bellows couplings can also be considered as compensating couplings which are suitable for transmitting rotary power. In this context, reference is made to DE 10 2011 118 989 A1, which describes a metal bellows coupling in which a steel bellows is welded to mounting hubs made of aluminum.

SUMMARY

The disclosure is based on the object of specifying a compensating coupling which has been developed further than the previously described prior art and is advantageous in terms of assembly, which compensates for at least one radial offset between a driving shaft and an output-side element and is particularly suitable for high speeds, such as those that occur in spindle bearing test rigs.

This object is achieved according to the disclosure by a compensating coupling with one or more of the features disclosed herein. The compensating coupling is suitable for compensating for a radial offset, i.e. lateral offset, between two rotating elements, in particular shafts, and comprises two outer coupling parts to be connected to the rotatable elements, namely an input-side coupling part and an output-side coupling part, as well as a center coupling part, which can be moved to a limited extent relative to the outer coupling parts, wherein a form-fitting interaction in relation to torsion loads is provided between the center coupling part and the outer coupling parts. The center coupling part is composed of a tube piece in the form of a damping element and two tube end pieces fastened to the tube piece and which are each designed to be fitted onto one of the outer coupling parts by means of ball head centering.

The design of the connections between the center coupling part and the outer coupling parts as mutually centered push-in connections is advantageous in various respects:

On the one hand, a very simple, tool-free assembly and disassembly of the compensating coupling is possible as a result. On the other hand, the three coupling parts can be balanced individually before assembly, with no new imbalances resulting from assembly. The tubular shape of the center coupling part also enables a low total mass and a low moment of inertia of the compensating coupling. Overall, the compensating coupling is thus designed as a lightweight coupling whose vibration transmission function has a high damping component.

The center coupling part is also said to be tubular if the torque transmitted via this coupling part mainly runs over a tubular outer area, whereas the inner area of the coupling part can be filled with a material, in particular foam, which does not contribute significantly to torque transmission, but which does play a role in terms of mechanical damping. Irrespective of the detailed design of the damping element of the lightweight coupling, which is designed as a tube piece, parasitic imbalance forces play practically no role in its operation.

The plug-in connections, which are made between the center coupling part and the outer coupling parts, can be designed without snap or clamping mechanisms. In a typical installation scenario, the center, tubular coupling part has one degree of freedom in the axial direction. The compensating coupling is therefore not only able to compensate for a lateral axis offset, but is also suitable for compensating for an axial offset. The outer coupling parts can either be permanently connected to the rotating elements, in particular shafts, or be designed as integral parts of such elements.

According to an advantageous development, at least one of the connections between the tube piece and the tube end piece is designed as an overload coupling. In particular, both connections between the tube piece and the tube end piece are designed as overload couplings, the load capacity of which is determined by an adhesive, for example an epoxy resin adhesive, introduced between the tube piece and the tube end pieces.

In contrast to locking overload couplings, the overload coupling produced with the aid of an adhesive is designed as a disengaging overload coupling. In principle, overload couplings which include an adhesive connection are known, for example, from EP 3 001 062 B1.

The triggering of the overload coupling or one of the overload couplings is not associated with the occurrence of significant imbalances. Even at very high speeds, no load peaks are introduced into the shafts, which are initially coupled to one another in a rotationally fixed manner, when the overload coupling is triggered.

The tube piece that is provided as the central element of the center coupling part and has a damping effect is made, for example, from a fiber-reinforced plastic, in particular CFRP, that is to say carbon fiber-reinforced plastic. Such a tube piece made of a non-metallic material is characterized by a high torsional rigidity, also together with the overload couplings produced by adhesive connections. In addition, the tube piece made of fiber-reinforced plastic acts as an electrical insulator and is therefore also suitable for applications, in particular test rig applications, in which induced motor currents occur. A thermal decoupling between the shafts that are mechanically coupled to one another is also implemented in this way.

The centering between the center coupling part and the two outer coupling parts is made according to various possible configurations with the help of two ball heads. Here, the ball heads can be components of the outer coupling parts or components of the tube end pieces and thus of the center coupling part. It is also possible that only one of the outer coupling parts has a ball head. In this case, the center coupling part also has exactly one ball head. In all cases, a torque is transmitted in that plane in which the centering is also established with the help of the ball head. Irrespective of which coupling parts the ball heads are assigned to, at most, small restoring forces are produced by the compensating coupling in the case of lateral and axial axis offset.

Torque transmission in the area of a ball head is possible, for example, by holding a pin in the ball head, which engages in a groove in another coupling part. Alternatively, a torque-transmitting connection between a ball head and the coupling part coupled thereto is produced with the aid of toothing on the ball head and on the named coupling part.

In all cases, the ball head is inserted into an appropriately dimensioned opening in the other coupling part. Optionally, an extension section connects to the ball head, which is supported with the interposition of at least one elastic ring on an inner peripheral surface of one of the coupling parts. In particular, the extension section is surrounded by a plurality of elastic rings, for example two rings. Irrespective of the number of rings, these enable the coupling part which has the ball head to be pre-centered in the associated further coupling part. Within the assembled compensating coupling, the elastic rings assume a damping function in addition to the tube piece.

The compensating coupling is particularly suitable in test benches for testing high-speed bearings, such as spindle bearings subjected to axial loads. With regard to the technical background, reference is made to DE 10 2006 011 978 A1 and DE 10 2009 050 153 A1.

BRIEF DESCRIPTION OF THE DRAWINGS

Two exemplary embodiments of the invention are explained in more detail below with reference to a drawing. In the drawing.

DETAILED DESCRIPTION

Figure 1:
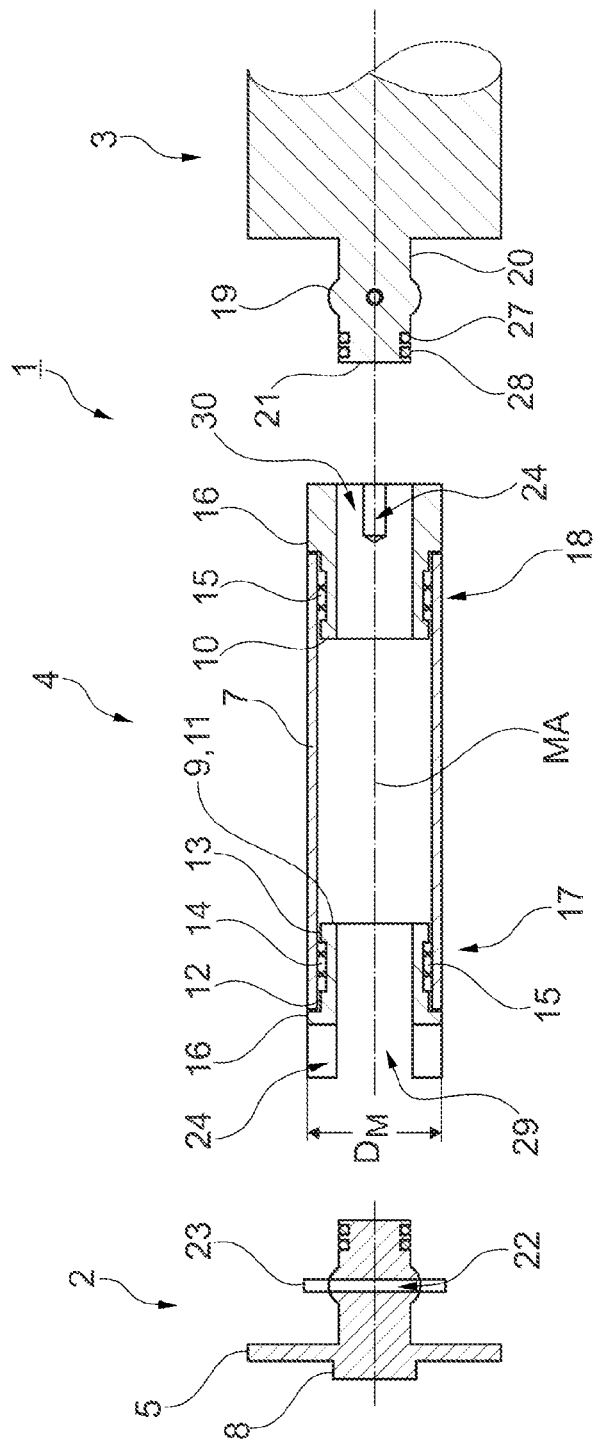
FIG. 1 shows a first exemplary embodiment of a compensating coupling.

Unless otherwise stated, the following explanations relate to both exemplary embodiments. Corresponding or basically identical parts are marked with the same reference symbols in all figures.

A compensating coupling, identified as a whole by the reference numeral 1, is intended for use in a test rig for spindle bearings. It is a high-speed application in which the compensating coupling 1 is operated under critical conditions. Spindle bearings with a speed index of up to 4,000,000 mmrpm are tested with the help of the compensating coupling 1. The compensating coupling 1 is thus part of a multi-shaft system operated at high speed.

The compensating coupling 1 comprises two outer coupling parts 2, 3, namely an input-side coupling part 2 and a driven-side coupling part 3, as well as a center coupling part 4 connecting the outer coupling parts 2, 3, which is designed as an intermediate coupling shaft. Overall, the compensating coupling 1 is able to compensate for both a lateral and an axial offset between the outer coupling parts 2, 3. The outer coupling parts 2, 3 are to be connected to shafts or other rotating elements. Alternatively, the coupling parts 2, 3 can be designed as integral components of such elements, that is to say of a driving element or an element on the output side.

In the exemplary embodiments, the input-side coupling part 2 has a flange 5 which is to be fastened to a driving element. Furthermore, a shaft 8 can be seen on the input-side coupling part 2, which can be used to center the input-side coupling part 2 on the driving element. As far as the coupling part 3 on the output side is concerned, a connection contour 6 can be seen in FIG. 2, which can be used for connection to a shaft on the output side. In the exemplary embodiment according to FIG. 1, the coupling part 3 on the output side is only partially shown.

The intermediate coupling shaft 4, which positively connects the outer coupling parts 2, 3 to one another in a manner that will be explained in more detail below, has a tube piece 7 in both exemplary embodiments, which acts as a damping element of the compensating coupling 1. The tube piece 7 is designed as a CFRP tube, which is wound with ultra-high modulus carbon fibers. In addition to its mechanical damping function, the tube piece 7 also represents an element for thermal decoupling and electrical insulation. In the arrangements according to FIGS. 1 and 2, the central axis of the tube piece 7, designated MA, and thus of the entire center coupling part 4, coincides with the central axes of the outer coupling parts 2, 3. The diameter of the center coupling part 4 denoted by $D_M$ is identical to the diameter of the tube piece 7. $L_M$ denotes the total length of the center coupling part 4.

In addition to the tube piece 7, two tube end pieces 9, 10, which are metal parts, are to be allocated to the center coupling part 4. An insert piece 11 is formed by each tube end piece 9, 10 and is held in the tube piece 7. The insert pieces 11 each have a first annular connecting section 12 and a second annular connecting section 13 spaced parallel therefrom. An intermediate section 14 with a comparatively small diameter is formed between the annular connecting sections 12, 13. The annular space between the intermediate section 14 and the inner peripheral surface of the tube piece 7 is filled with an adhesive 15, through which an overload coupling 17, 18 is formed. A front contact section 16 of the insert piece 11 borders on the two ends of the tube piece 7.

The center coupling part 4 is in each case centered relative to the outer coupling parts 2, 3 with the aid of a ball head 19, which is also generally referred to as a spherical section, so that there is a double ball head centering. Viewed in the longitudinal direction of the central axis MA, the spherical section 19 is adjoined on the one hand by a neck 20 and on the other hand by an extension section 21.

In the embodiment according to FIG. 1, the ball heads 19 are parts of the outer coupling parts 2, 3. A pin 23, which acts as a torque-transmitting element, is inserted through a bore 22, which runs through the center of the ball head 19 and intersects the central axis MA at right angles. The pin 23 engages in a longitudinal groove 24 which is located in the tube end piece 9,10. As is known from Oldham couplings, the pins 23 of the two outer coupling parts 2, 3 are rotated by 90° relative to one another. However, in contrast to conventional Oldham couplings, the center coupling part 4 cannot be displaced in relation to the outer coupling parts 2, 3, but can only be slightly tilted.

Figure 2:
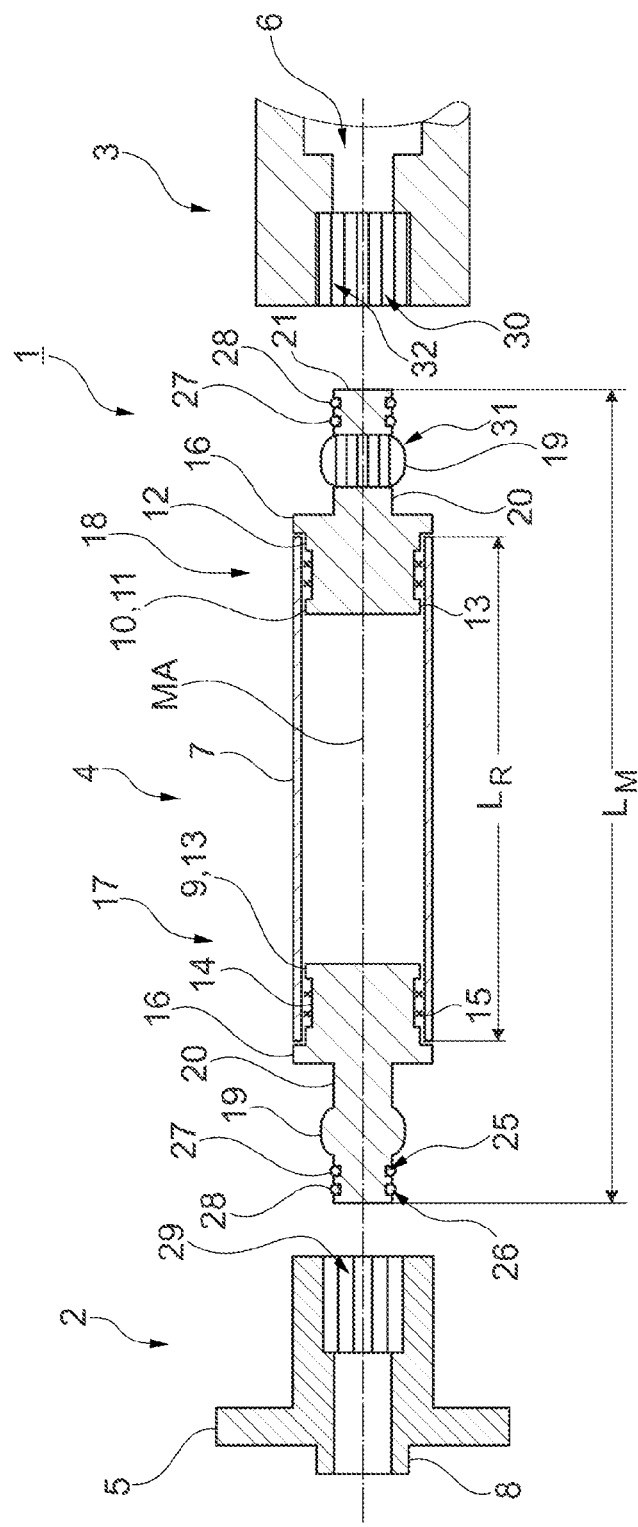
FIG. 2 shows a second exemplary embodiment of a compensating coupling.

The centering of the center coupling part 4 relative to the outer coupling parts 2, 3 with the aid of two spherical heads 19 is also provided in the exemplary embodiment according to FIG. 2. In this case, the ball heads 19 have external toothing 31 which each engage in an internal toothing 32 in a form-fitting manner, enabling the transmission of a torque. The internal toothing 32 is formed in bores 29, 30 of the outer coupling parts 2, 3, while the ball heads 19 are formed as integral components of the tube end pieces 9, 10 on the insert pieces 11.

In both exemplary embodiments, there are two annular grooves 25, 26 in the extension section 21, in each of which an O-ring 27, 28 is inserted. The O-rings 27, 28, i.e. damping rings, represent a means of pre-centering when assembling the compensating coupling 1. In addition, the O-rings 27, 28 act as damping elements that are effective in the axial direction during operation of the compensating coupling 1.

The compensating coupling 1 is assembled by simply plugging the coupling parts 2, 3, 4 together. In a similar manner, the equalizing coupling 1 can be dismantled by pulling the coupling parts 2, 3, 4 apart, wherein access to the equalizing coupling 1 from one side, i.e. either from the input-side coupling part 2 or from the driven-side coupling part 3, is sufficient.

LIST OF REFERENCE SYMBOLS

1 Compensating coupling
2 Outer coupling part, input-side
3 Outer coupling part, output-side
4 Center coupling part, intermediate coupling shaft
5 Flange
6 Connection contour
7 Tube piece, damping element
8 Shaft on the input-side coupling part
9 Tube end piece, input-side bushing
10 Tube end piece, output-side bushing
11 Insert piece
12 First annular connecting section
13 Second annular connecting section
14 Intermediate section
15 Adhesive
16 Front-side attachment section
17 Overload coupling
18 Overload coupling
19 Spherical section, ball head
20 Neck
21 Extension section
22 Bore
23 Pin
24 Groove, longitudinal groove
25 Annular groove
26 Annular groove
27 O-ring
28 O-ring
29 Bore
30 Bore
31 External toothing
32 Internal toothing
$D_M$ Diameter of the center coupling part
$L_M$ Length of the center coupling part
$L_R$ Length of tube piece
MA central axis

The invention claimed is:

1. A compensating coupling for compensating for a radial offset between two rotatable elements, the coupling comprising:
    two outer coupling parts configured for connection to the rotatable elements, including an input-side coupling part and an output-side coupling part;
    a center coupling part that is movable to a limited extent relative to the outer coupling parts;
    the center coupling part comprises a tube piece and two tube end pieces fastened to the tube piece, each of the tube end pieces comprise a first annular connecting section and a second annular connecting section spaced parallel therefrom, with an intermediate section having a reduced diameter formed between the first annular connecting section and the second annular connecting section; and
    the two tube end pieces are each configured to be fitted onto a respective one of the outer coupling parts centered by ball head centering, wherein the center coupling part is centered relative to the outer coupling parts by a respective ball head, and a torque-transmitting connection between the ball head and the coupling part coupled thereto is provided by a pin fixed in the ball head and a corresponding groove in said coupling part.

2. The compensating coupling according to claim 1, wherein the ball heads are components of the respective outer coupling parts.

3. The compensating coupling according to claim 1, wherein the ball head is followed by an extension section which, via interposition of at least one elastic ring, is configured to rest on an inner peripheral surface of one of the tube end pieces.

4. A compensating coupling for compensating for a radial offset between two rotatable elements, the coupling comprising:
    two outer coupling parts configured for connection to the rotatable elements, including an input-side coupling and an output-side coupling part;
    a center coupling part that is movable relative to the outer coupling parts;
    the center coupling part comprises a tube piece and first and second tube end pieces fastened to respective first and second ends of the tube piece; and
    the first and second tube end pieces are engageable on, respectively, the input-side coupling part and the output-side coupling part, centered by respective ball heads,
    wherein at least one of the ball heads is followed by an extension section which, via interposition of at least one elastic ring, is configured to rest on an inner peripheral surface of one of the coupling parts; and
    wherein a torque-transmitting connection between the ball head and the coupling coupled thereto is formed via toothing of the ball head and corresponding toothing of the coupling part.

5. The compensating coupling according to claim 4, the ball heads are components of the tube end pieces.

* * * * *